US012645958B2

(12) United States Patent     (10) Patent No.: US 12,645,958 B2
Cai et al.                         (45) Date of Patent:      Jun. 2, 2026

(54) MACHINE LEARNING BASED MODEL FOR DETERMINING EFFECTIVE COMMUNICATION MECHANISM WITH USERS

(71) Applicant: Humana Inc., Louisville, KY (US)

(72) Inventors: Yunliang Cai, Lexington, MA (US); Peyman Yousefian, Frederick, MD (US); Sravya Etlapur, Rochester, MN (US)

(73) Assignee: Humana Inc., Louisville, KY (US)

( * ) Notice:     Subject to any disclaimer, the term of this patent is extended or adjusted under 35 U.S.C. 154(b) by 1156 days.

(21) Appl. No.: 17/322,738

(22) Filed:     May 17, 2021

(65)          Prior Publication Data

US 2022/0366279 A1     Nov. 17, 2022

(51) Int. Cl.
G06N 5/04       (2023.01)
G06N 20/00      (2019.01)
H04L 67/306     (2022.01)

(52) U.S. Cl.
CPC .............. G06N 5/04 (2013.01); G06N 20/00 (2019.01); H04L 67/306 (2013.01)

(58) Field of Classification Search
CPC ......... G06N 5/04; G06N 20/00; G06N 67/306
See application file for complete search history.

(56)          References Cited

U.S. PATENT DOCUMENTS

| | | | |
|---|---|---|---|
| 2014/0347265 A1* | 11/2014 | Aimone ................. | G02C 11/10 |
| | | | 345/156 |
| 2018/0033053 A1* | 2/2018 | Barak .................... | H04L 67/535 |
| 2019/0147366 A1* | 5/2019 | Sankaran ............... | G06N 20/00 |
| | | | 706/12 |
| 2020/0293923 A1* | 9/2020 | Zhu .................... | G06Q 30/0204 |

* cited by examiner

*Primary Examiner* — Lut Wong
(74) *Attorney, Agent, or Firm* — Standley Law Group LLP; Jeffrey S. Standley; James L. Kwak

(57)          ABSTRACT

A system uses a machine learning based model to select a channel for communicating with users. The system generates a feature vector based on a user profile of the user. The user profile data includes time series data describing past communications to users and past user actions. The system executes one or more machine learning based models, each machine learning based model configured to receive a feature vector describing a particular user and predict a likelihood of the particular user performing an expected user action responsive to a communication sent via the communication channel. The system selects a communication channel based on the results of the machine learning based models and sends a communication to the user via the selected communication channel.

3 Claims, 5 Drawing Sheets

System Environment 105

Identify user for sending communication
410

Access user profile data for the identified user
420

Extract features from the user profile data to build feature vector
430

Execute machine learning based model using the feature vector to determine communication channel for use for the user
440

Communicate with the user using the selected communication channel
450

MACHINE LEARNING BASED MODEL FOR DETERMINING EFFECTIVE COMMUNICATION MECHANISM WITH USERS

BACKGROUND

The disclosure relates to communication with users in general and more specifically to machine learning based models for determining the most effective communication channel for interacting with users.

Organizations perform interactions with users on a regular basis. Such interactions may be performed using various communication mechanisms such as SMS text, automated phone calls, live agent calls, and so on. A communication mechanism may also be referred to as a communication channel. Different users respond differently to communications performed using different communication mechanisms. For example, some users may be more responsive to text messages whereas others may be more responsive to a live agent call. Accordingly, the rate at which users respond depends on the communication mechanism used to interact with the users.

Organizations often use simple rule-based heuristics for determining how to communicate with users. These heuristics may use broad categorizations of users and are not personalized to specific user's conditions and behavior. Furthermore, these rule-based techniques lack quantitative measures to monitor efficiency of the communication mechanisms, thereby making the process difficult to adapt to continuously changing data. As a result, the communication mechanism used for a specific user may not be effective for the user. Use of an ineffective communication mechanism to communicate with users results in lower rate of user response. This results in waste of communication and computational resources. Furthermore, the organization fails to achieve the goal that the organization was attempting to reach based on the user responses.

SUMMARY

A system uses a machine learning based model to select a channel for communicating with users. The system can communicate with users using various communication channels, for example, a communication channel for sending text messages, a communication channel for leaving voice mail, a communication channel for calling via live agent, and so on.

The system identifies a user for sending a communication via one of a communication channels. The system generates a feature vector based on a user profile of the user. The user profile data includes time series data describing past communications to users and past user actions. The system accesses one or more machine learning based models, each machine learning based model configured to receive a feature vector describing a particular user and predict a likelihood of the particular user performing an expected user action responsive to a communication sent via the communication channel. For each communication channel, the system provides the generated feature vector for the user as input to a machine learning based model and executes the machine learning based model to determine the likelihood of the user performing the user action if the user were sent a communication using the communication channel. The system selects a communication channel based on the results of the machine learning based models and sends a communication to the user via the selected communication channel.

In an embodiment, the machine learning based model is a gradient boosted decision tree based model but is not limited to this type of model and can be other type of machine learning model. In an embodiment, the machine learning based model is a binary classifier.

In an embodiment, the machine learning based model for a communication channel is trained using training data generated as follows. The system selects a set of users. For each user from the set, the system accesses (1) a communication time series representing communications performed to the user at various time points using the communication channel and (2) an event time series data representing events indicating instances of expected user action performed by the user at various time points. The system determines whether the user is responsive to communications performed using the communication channel based on the communication time series and the event time series and labels the user based on the determination.

In an embodiment, the system determines whether the user is responsive to communications performed using the communication channel based on the communications time series and the events time series by performing a causality analysis of the communications time series and the events time series. In an embodiment, the system uses Granger causality analysis to determine a measure of responsiveness of the user to a communication mechanism. The system generates a score based on the causality analysis and compares the score with a predetermined threshold to determine whether the user is responsive to communications performed using the communication channel.

In an embodiment, the system uses a feedback loop to improve the training of the machine learning based models. The system compares predictions of a trained model with results of causality analysis. If the comparison shows a conflict, the system may take suitable action, for example, removing the user from the training dataset or relabeling the based on further analysis. The system retrains the machine learning based model if one or more users from the training data are relabeled or removed from the training dataset. This process may be repeated until some convergence criteria is met.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Organizations attempt to predict the right communication channel to use for interacting with a particular user. A system according to various embodiments determines the optimal communication channel to use for communicating with a user using machine learning based models. The system performs causality analysis of time series data for a user representing past communications and past user responses to automatically label training dataset for training the machine learning based models. Automatic generation of training dataset allows the system to generate large training dataset in a cost effective manner. Use of the optimal communication channel to communicate with the users results in an improved rate of user response based on the communications.

Overall System Environment

Figure 1:
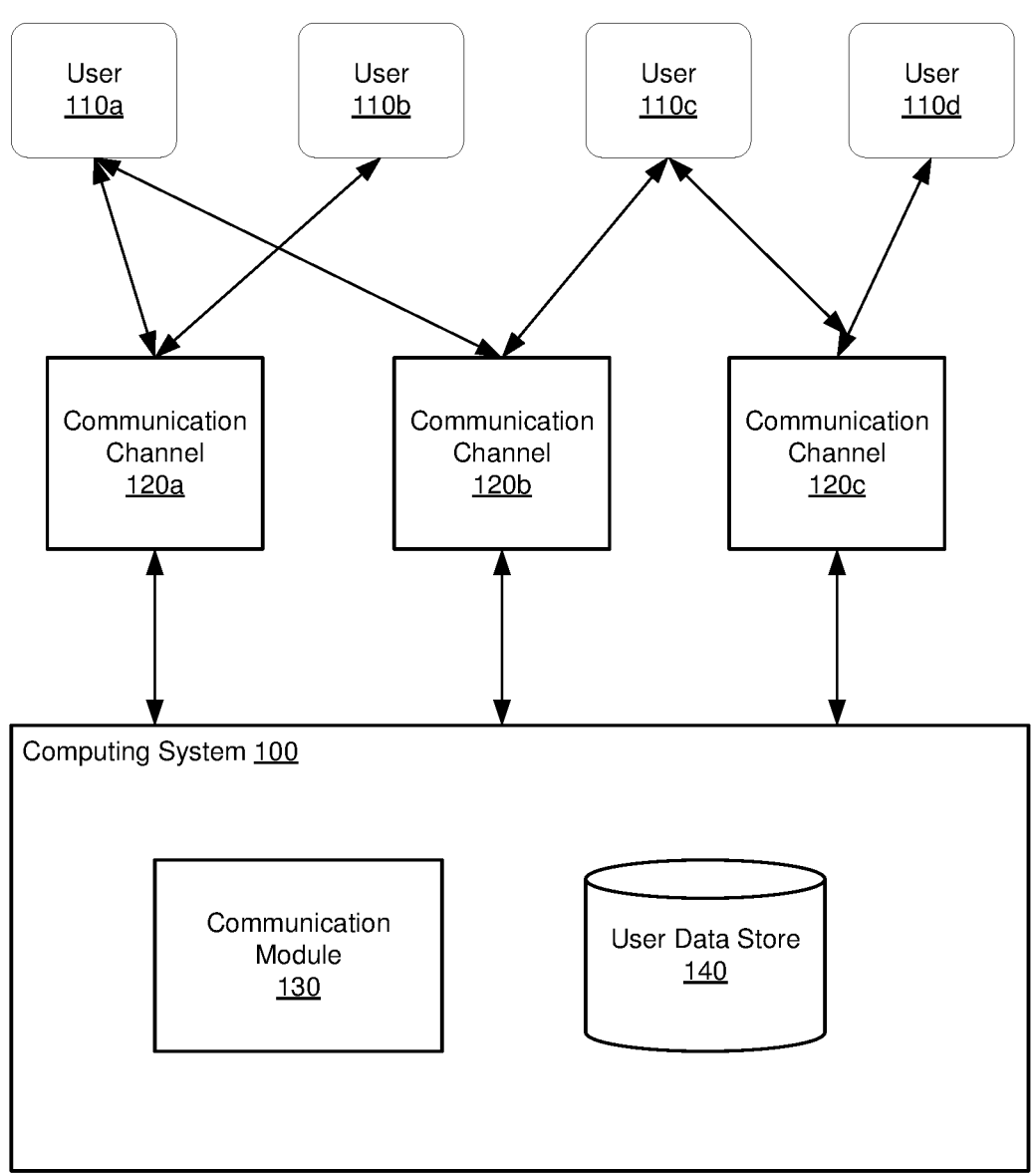
FIG. 1 shows the overall system environment of a system configured to communicate with users via multiple communication channels to invoke a user interaction from the users, according to an embodiment.

FIG. 1 shows the overall system environment of a system configured to communicate with users via multiple communication channels to invoke a user interaction from the users, according to an embodiment. The overall system environment 105 includes a computing system 100 that can communicate with users 110 using communication channels 120. In other embodiments, more or fewer systems/components than those indicated in FIG. 1 may be used. Furthermore, there may be more or less instances of each system shown in FIG. 1, such as the communication channels 120.

The computing system 100 includes a communication module 130 and a user data store 140. Other embodiments of the computing system 100 may include more or fewer modules.

The user data store 140 stores attributes of users. The user data store 140 may store demographic data describing the user including age, gender, and so on. The user data may store other attributes of a user, for example, member behavior preference, activity preference, or billing preferences. Some of the attributes may be represented using numerical values and some attributes represented a categorical indexes. The attributes represent features of the specific domain for which the computing system 100 is used. For example, if the computing system is used for managing health care information for users, the user store 140 stores health care profiles for the users including any relevant medical conditions of the user. User attributes may represent values that are specific to a domain for which the computing system 100 is used. For example, if the computing system is used for managing health care information for users, the user data store 140 may store health care profiles for the users including any relevant medical conditions of the user.

Although several examples are presented based on a healthcare domain, the techniques disclosed are not limited to health care domain and can be applied to other domains in which an organization or a system needs to communicate with users. For example, if the organization represents a business and the user represents a customer of the business, the user data store may include past purchases by the user, the type of products/services that the customer has received in the past, financial status, location, and so on.

Examples of communication channels 120 include messaging platforms such as SMS text, automated phone calls, live agent calls, using a third-party system to reach a user, and so on. The communication module 130 includes instructions for communicating with a user using any of the communication channels.

The users perform certain user actions in response to the communication received by the user via a communication channel. These are target user actions that the organization maintaining the computing system 100 expects the users to perform. For example, if the organization if a pharmacy that performs outreach to patients to pick up medication, the expected user action is the user picking up the medication. If the organization is a business enterprise, the expected user action may be, the user purchasing an item or performing an interaction associated with an item, for example, requesting additional material describing the item, registering with a website associated with the organization, recommending the item to another user, filling out a survey related to the item, and so on.

The communication module 130 uses machine learning techniques to determine the optimal communication channel to use for communicating with a user so as to maximize the likelihood that the user will perform an expected user action. Further details of the communication module 130 are described herein, for example, in connection with FIG. 2.

Typically, the computing system 100 performs repeated communications with each user over time and also monitors the user actions over time. As a result, the computing system stores a time series representing the communications performed with each user and also one or more time series representing the user actions as they occur. Time series information may be represented as pairs (t, v) where t is a timestamp value and v is a data value. The time series information may be stored in the user data store 140 or in a separate time series data store that is linked to the user data store 140. The communication time series may be represented as a binary time series. Accordingly, the communication time series is represented using binary values, i.e., the value for a date (or a timestamp) is one if a communication was sent to the user on that day or else the communication time series value is zero.

The user data store 140 includes time series data associated with the user. The time series data associated with the user includes (1) communication time series data and (2) event time series data. The communication time series data includes instances of communications performed by the organization or the system with the user. The communication module 130 may perform communications with a user using any of the communication channel. The user data store 140 stores a time series representing the communications performed with the users and the corresponding timestamps at which the communication was performed. A communication may represent an intervention performed for a user to inform the user about medication that the user needs to pick up from a pharmacy.

The event time series data represents events associated with the user. Event time series is also referred to as behavior time series, since the user behavior determines the events associated with the user. In an embodiment, the events represent health care events associated with the user. As an example, an event may indicate that the user picked up medication from a pharmacy. The event time series represents timestamps associated with events associated with the user. The timestamp may be represented as a data, for example, the date when a user picks up the medication from a pharmacy. In an embodiment, the event time series is represented using binary data, for example, a value of 1 for a date indicates that the user had mediation and a value of 0 indicates that the user does not have medication. Accordingly, the event time series represents values of an attribute describing the user, the attribute associated with an event. If the attribute value if greater than a threshold, the event time series has a value V1 for a timestamp (or date) and the event time series has a value V2 otherwise. If the user attribute has binary values, the event time series may use the binary values of the user attribute at each time point.

The user data store may represent event duration using a binary time series. For example, the event time series data may represent the last day for an event to finish, for example, the last day on hand (LDOH) event indicating that the user runs out of medication on that day unless the user picks up medication. Accordingly, the event time series value for a day has value one if the day represents an LDOH event and a value zero otherwise.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

System Architecture

Figure 2:
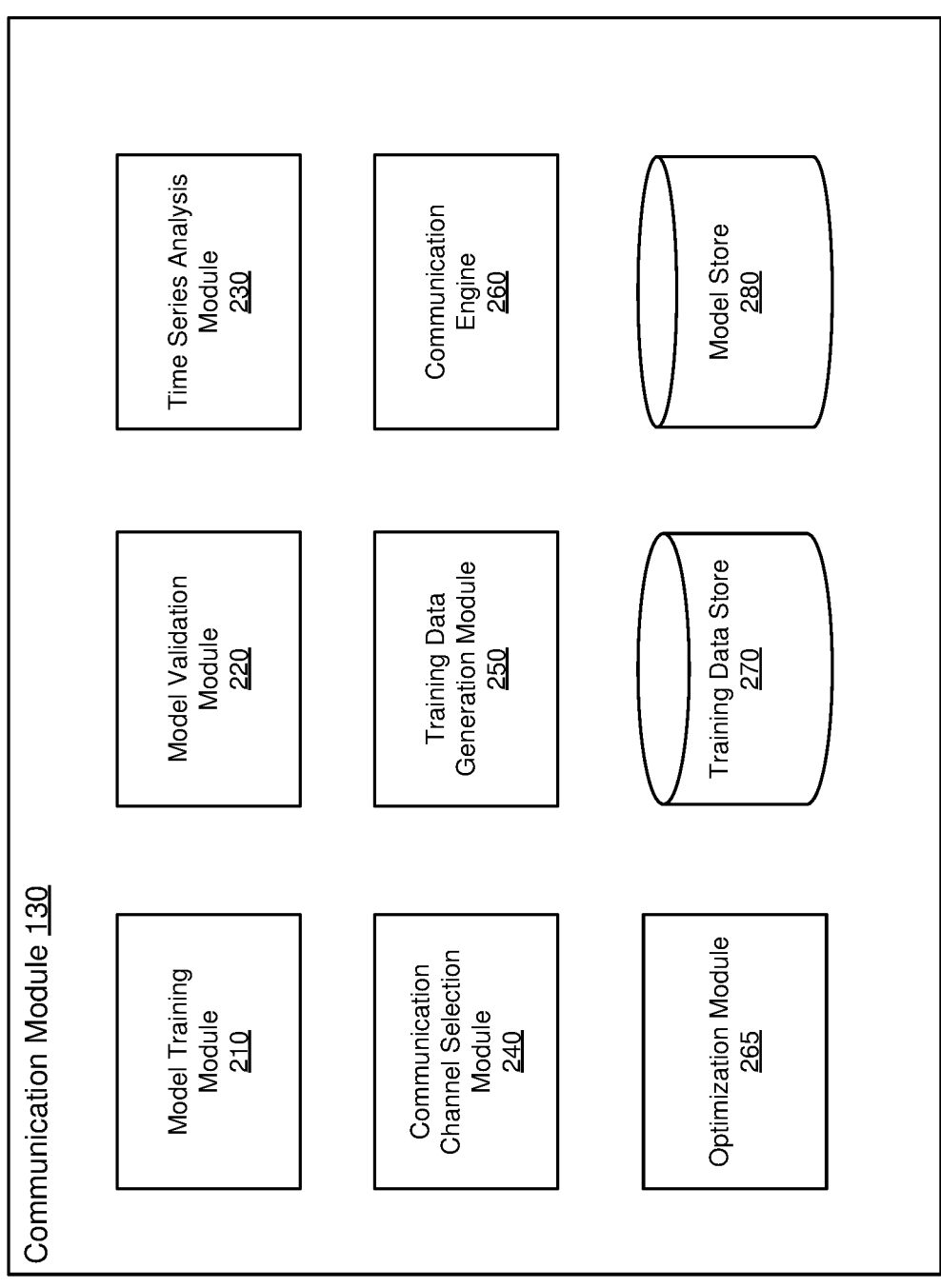
FIG. 2 shows the system architecture of the communication channel selection module, according to an embodiment.

FIG. 2 shows the system architecture of the communication module 130, according to an embodiment. The communication module 130 includes a model training module 210, a model validation module 220, a time series analysis module 230, a communication channel selection module 240, a training data generation module 250, a communication engine 260, a training data store 270, and a model store 280. Other embodiments may include other modules. Actions indicated as being performed by a particular module may be performed by other modules than those indicated herein.

The machine learning based model is configured to receive a feature vector describing a user as input and output a score indicating a likelihood of the user performing the expected user action in response to receiving a communication via a particular communication channel. In an embodiment, the machine learning based model performs binary classification. Accordingly, the machine learning based model outputs a binary label (i.e., value zero or one given a data input representing the user profile that may include the users health care profile data. For a healthcare system, the binary classification a user's response to outreach performed by the healthcare system as the refill pickup behaviors are reflected in healthcare profile data. An example of machine learning based model that may be used is a gradient boosted decision tree based model. However, other types of machine learning based models may be used and the techniques disclosed are applicable to other types of machine learning based models.

The training data generation module 250 generates training data for training the machine learning based models and stores the training data in the training data store 270. The model training module 210 trains machine learning based models used for determining the optimal communication channel to communicating with a user. The training data generation module 250 invokes the time series analysis module 230 to analyze time series data representing past instances of communication by the computing system 100 with a user and user interaction data from that user. The time series analysis module 230 analyzes time series data to generate labels for user indicating the likelihood of a user performing the expected user action in response to use of a particular communication channel to communicate with the user.

A model trained by the model training module 210 is validated by the model validation module 220. The model validation module 220 receives a trained model and executes it using a data set to evaluate the model using various criteria. A model that passes the various criteria is determined to be validated. A model that fails one or more criteria may be trained further using additional training dataset. A model that is successfully validated is used by the communication channel selection module 240 for determining the communication channel that is most likely to be effective for a particular user. A machine learning based model that fails validation may be retrained using additional training data and the process repeated until the model passes validation.

The machine learning based models are stored in the model store 280. A model comprises a set of parameters that are stored in the model store 280. The parameters of a model are adjusted using the training data during the training phase of the model. A model is associated with a set of instructions used for executing the model. The parameters of the model are processed using instructions for the model by the communication channel selection module 240.

The training data used for training the machine learning based models includes samples based on various users that have user interaction data available. The training data includes, for each user, a feature vector describing user profile attributes of the user and labels indicating the communication channels that are determined to be optimal for each user.

The communication engine 260 includes the instructions for interfacing the various communication channels. For example, if the effective communication channel is selected to be a messaging channel, the communication engine 260 invokes the right application programming interface (API) to send a message to the user. If the effective communication channel is selected to be an automatic voice bases channel, the communication engine 260 invokes the right API to construct the audio signal and send as an automatic voice message to the user.

The time series analysis module 230 analyses the time series associated with the users to determine attributes describing the users for use as features for inputting to the machine learning based model configured to determine. The time series analysis module 230 determines a measure of correlation between a communication time series and an event time series for a user. The communication module 130 uses the measure of correlation between a communication time series and an event time series for the user as a measure of the degree to which the user responds to communications performed using a particular communication channel. In an embodiment, the time correlation analysis performed is a causality analysis providing a measure of a degree to which the event time series is determined to be caused by the communication time series.

In an embodiment, the causality analysis is the Granger causality analysis. According to the Granger causality analysis, a variable X that evolves over time is determines to cause another evolving variable Y if predictions of the value of Y based on Y's own past values and on the past values of X are better than predictions of Y based only on Y's own past values. The causality analysis quantifies the causal effect from the communication time series to the event time series. A high causal correlation indicates that the communication channel is effective for that user's actions in response, for example, the users refill behaviors.

In an embodiment, the causality analysis returns a p-value and the user is labeled with the numerical value p, from the p-value obtained from the causality analysis. The p-value represents a probability value, indicating how likely it is that the data could have occurred under the null hypothesis. The p-value represents the probability of obtaining results at least as extreme as the observed results of a statistical hypothesis test, assuming that the null hypothesis is correct. The system compares the p-value of the causality analysis with a threshold, (for example, 0.05) to determine a binary label for the user. For example, the binary label may of one or, indicating that the communication channel is effective (e.g., if $p<0.05$) or not effective (e.g., $p>0.05$) respectively. In an embodiment, the system performs causality analysis for all users in training set to obtain the binary label for each user.

Overall Process

One problem with training a machine learning based model to predict a communication channel for communicating with users is the lack of labelled training data. Creating training data manually using experts is a time consuming and expensive effort. Furthermore, only a limited training data can be generated using such a manual process. Embodiments automatically generate training data for training the machine learning based models described herein.

Figure 3:
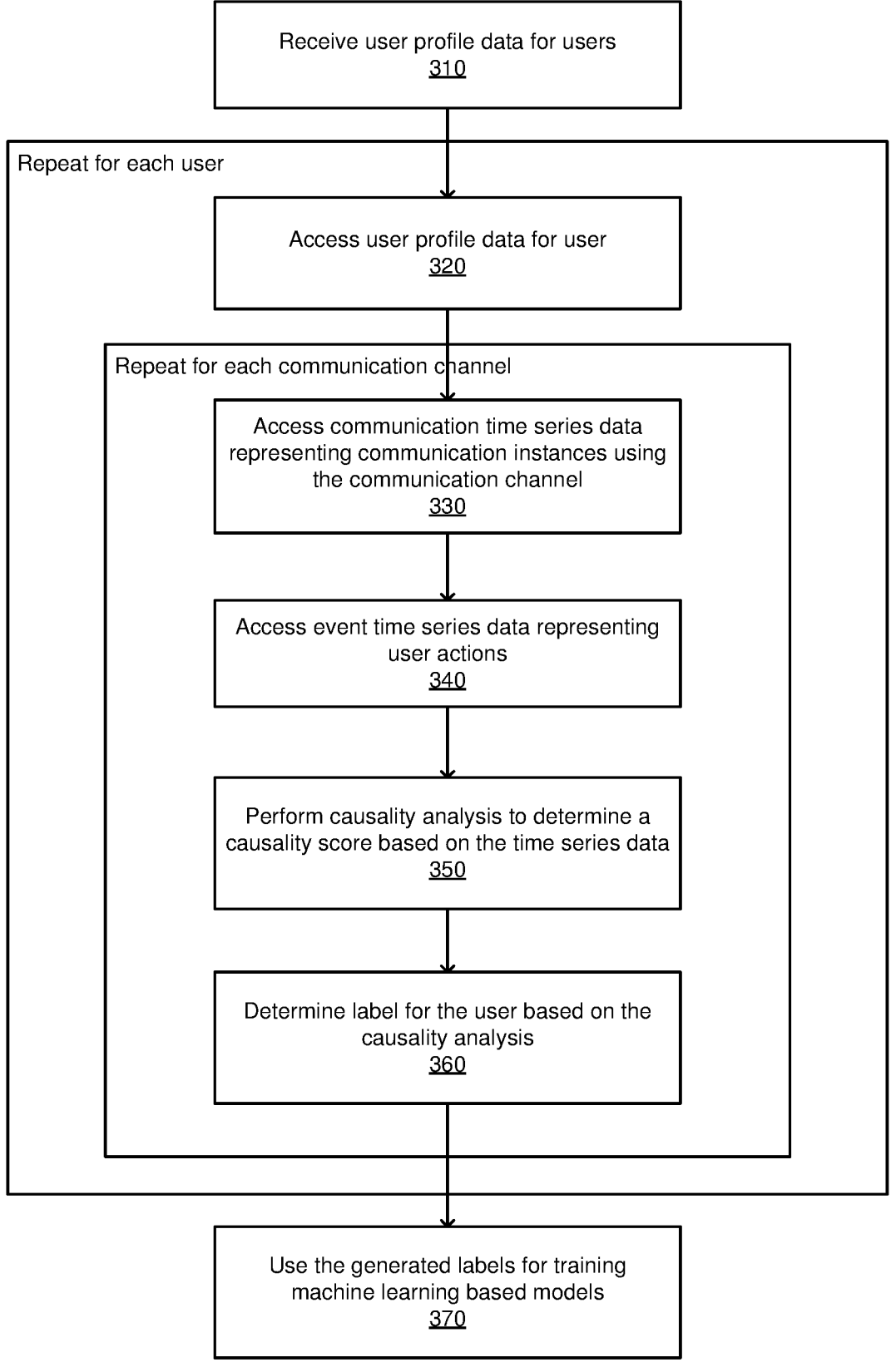
FIG. 3 shows a flowchart illustrating the process for generating training data for training a machine learning based model, according to an embodiment.
Figure 4:
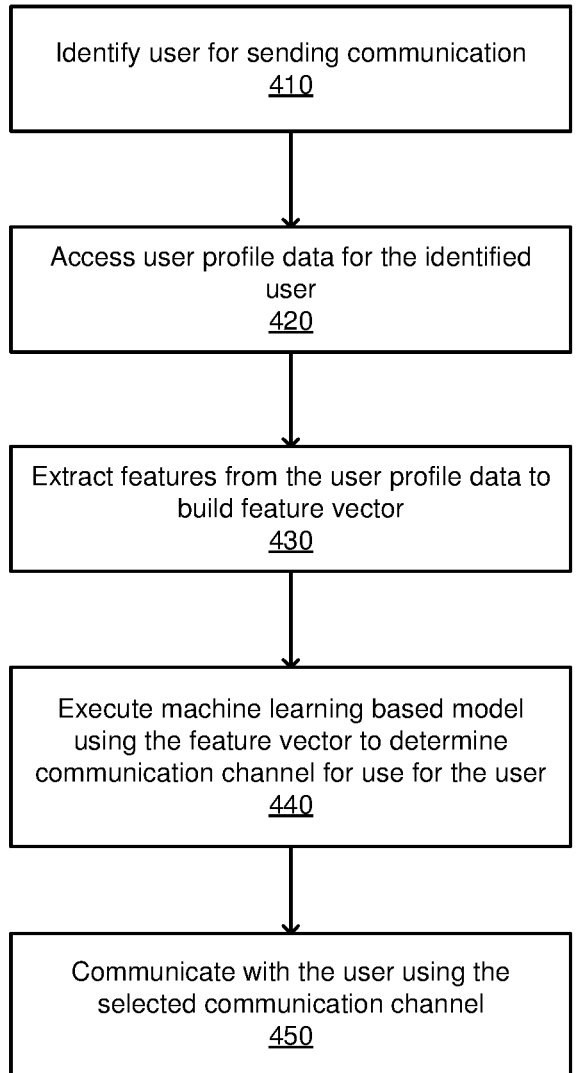
FIG. 4 shows a flowchart illustrating the process for using the machine learning based model for communicating with a user, according to an embodiment.
Figure 5:
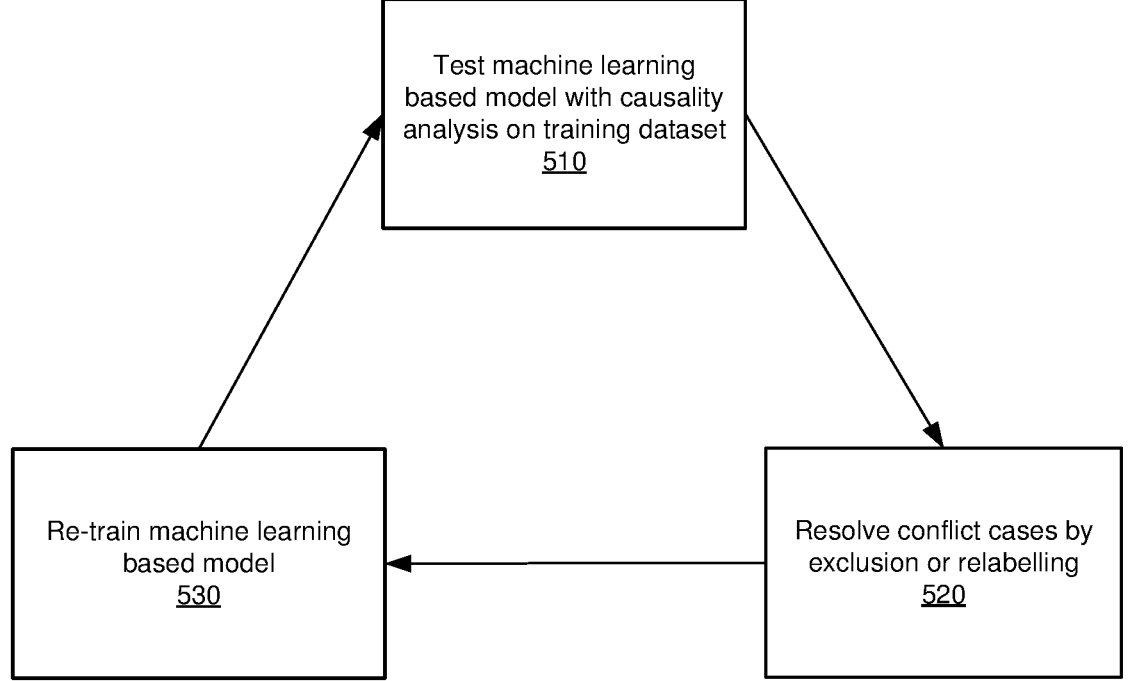
FIG. 5 shows a flowchart illustrating the feedback process for improving the machine learning based model, according to an embodiment.

FIGS. 3-5 illustrated various processes for training and executing machine learning based models for determining communicating channels for communicating with users according to various embodiments. The steps described herein for a process may be performed by modules other than those described herein. Furthermore, the steps may be performed in an order different from that shown herein, for example, certain steps may be performed in parallel.

FIG. 3 shows a flowchart illustrating the process for generating training data for training a machine learning based model, according to an embodiment. The steps of the process may be executed by the communication channel selection module 130 or by other modules. The following description indicates the steps being executed by the computing system 100, also referred to as the system.

The system receives 310 user profile data for users. The user profile data may be the data stored in the user data store 150. The system performs the following steps 320, 330, 340, 350, 360 for each user. The system accesses 320 the user profile data for the user. The system repeats the following steps 330, 340, 350, 360 for each user and for each communication channel supported by the system or for a subset of communication channels supported by the system. The system accesses 330 the communication time series data representing instances of communication performed with the user using the communication channel. The system accesses 340 the event time series data representing user actions, for example, instances of expected user actions performed by the user. The system performs 350 the causality analysis, for example, the causality analysis performed by the time series analysis module 230. The system determines a measure representing whether the event time series for the user is caused by the communication time series describing communications using the particular communication channel. The system determines a label for the user for the communication channel based on the result of the causality analysis. Accordingly, the user is assigned a score indicating a high likelihood of performing the expected user action if the user receives a communication sent via the communication channel if the causality analysis indicates that the communication time series has a statistically significant causal effect on the event time series.

Repeating the above steps for each user and for each communication channel for each user allows the system to generate labeled training data. The system uses 370 the training data for training machine learning based model for determining communication channel to be used for communicating with a new user that is identified.

FIG. 4 shows a flowchart illustrating the process for using the machine learning based model for communicating with a user, according to an embodiment. The system identifies 410 a user for sending a communication. For example, a health care system may identify a user for communicating regarding picking up medication. The system accesses 420 user profile data for the user, for example, from the user data store 150. The system extracts 430 features from the user profile data generate a feature vector based on the user profile data for the user. The system provides the feature vector as input to the machine learning based model as input and executes 440 the machine learning based model using the feature vector to determine communication channel for use for the user. In an embodiment, the system executes multiple machine learning based models, one for each communication channel, to determine the likelihood of the user performing an expected action based on the communication using the channel. For example, for a health care system reaching out to a user regarding medication prepared for the user, the expected action is that the user picks up the medication prepared for the user. The system selects the communication channel with the highest likelihood of the user performing the expected action based on the output of the machine learning based models. The system communicates 450 with the user using the communication channel selected based on the output of the machine learning based model.

In some embodiments, a model may be trained to output a vector of scores, one score for each communication channel. Accordingly, a single machine learning based model may be executed to determine the scores for all the communication channels. The scores ate compared against each other to select the optimal communication channel, for example, the communication channel that has the score indicative of highest likelihood of the user responding if the user receives a communication via that communication channel.

In an embodiment, the system further analyses the trained model using the causality analysis results. If the causality analysis result (explicit indicator) agrees with binary classification of the machine learning based model (implicit indicator), the system determines that there is high likelihood that the user's response to communication using that particular communication channel (i.e., outreach) will correspond to the way the user is classified.

FIG. 5 shows a flowchart illustrating the feedback process for improving the machine learning based model, according to an embodiment. The system tests 510 the trained machine learning based model using causality analysis. The system selects users from the training dataset to perform the testing

510. The system determines whether the result obtained by causality analysis conflicts with the result obtained by executing the machine learning based model. If the system identifies conflicts for a user, the system resolves the conflict as follows: the system may exclude the user from the training dataset, send the user profile for review by an expert, or relabel the user.

The system may relabel the user by assigning the user, a label using the result of the causality analysis. If the causality analysis is not possible for a user, for example, of sufficient time series data (refill/outreach data) is not available for the user, the system uses the trained machine learning based to test the effectiveness of communication (e.g., outreach) using a communication channel. If there are more than a threshold number of conflicts, or if the system relabels one or more users, or if the system excludes one or more users from the training dataset, the system retrains 530 the machine learning based model. The system may repeat the process shown in FIG. 5 for the retrained model.

Applications

The channel selection techniques discussed herein may be used for various applications that require reaching out to users. For example, healthcare providers may reach out to users to inform them of medications that they need to pick up. Accordingly, the techniques may be used by pharmacies for outreach of members under medical conditions (for example, diabetes) who are with medical refill gaps, thereby helping the pharmacy close the gaps. It is important for several member with specific medical conditions such as diabetes, to ensure that there are no medical refill gaps, to ensure they have adequate supply of the medication to avoid further complications to their medical conditions. Accordingly, health care provides reach out to the member to remind the member to pick up their medication. The pharmacy or any healthcare provider may use various communication channels for reaching out to members including automatic voice call, live agent call such as clinician call, in-pharmacy intervention, intervention via a third-party company, for example, drug companies, and so on. Different users respond differently to specific channels and some channels are more effective in reaching the members. The techniques allow the system to predict the optimal communication channel for reaching a particular member to increase a chance the chance member would be reached successfully and pick up the medication as a result.

The user interaction data for these domains includes dates of receiving refills, dates and types of the outreaches for each member, and so on. The user interaction data may be stored as a binary time series, for example, value 1 indicating that member has refill/outreach on that day, and value 0 otherwise. The user interaction data may be stored for one year or multiple years. For these domains, the user profile data include members health care related values, for example, probabilities of use tobacco/alcohol, diet habits, exercise habits, and so on, and pharmacy related values, for example, adherence. The user profile data may be represented as numerical values or as categorical indexes.

Other organizations that may use the techniques disclosed include organizations that work with clients that may reach out to representatives of clients, sales departments that may reach out to customers or potential leads, and so on. Use of the techniques ensures that the organization has a higher success rate in reaching the users and are able to receive better response from the users. The rate of user response typically affects the results that the organizations aim to achieve, for example, business.

Technological Improvements

Conventional techniques for determining the right communication channel for reaching out to users are based on rigid rule-based techniques. These techniques suffer from several drawbacks. More specifically, these are not customized to individual users. At best they may use broad categories of users and apply specific rules for each category. Still, these techniques are not optimized and personalized for individual users. In contrast, the techniques disclosed according to various embodiments are optimized and personalized to individual users. Another drawback of the rule base techniques is that they do not adapt to continuously changing data. For example, a user's behavior may change over time, but the rule based technique may continue to make the same prediction for the user since prediction is based on rigid and simplistic rules based on user characteristics that may not reflect the change in user behavior. To monitor the change in user behavior the system needs to analyze the time series data representing the user interactions, which is not performed by conventional rule-based systems.

An alternative to rule-based systems is use of machine learning based techniques for making predictions. User interaction data are stored as time series data. Machine learning models are used for making predictions based on time series data. Examples of machine learning based models that may be used for analyzing time series data include recurrent neural networks, long short-term memory (LSTM) neural networks, and so on. Techniques such as recurrent neural networks process the time series data element by element to make predictions based on the data. As a result, the neural network computation is executed several times, once for each element of the time series data. This can be a computationally slow process for long time series and complex neural network computations. LSTM is an extension of recurrent neural networks and processed the time series data in the same manner as a recurrent neural network. Embodiments improve the computational efficiency of the processing of the time series data compared to systems such as those based on recurrent neural networks that are typically used for making predictions based on time series data. This is so because the techniques use efficient causality techniques to process the time series data to determine correlation between time series before providing the information as input to the machine learning based model. Accordingly, the machine learning computation does not have to be executed individually for each element of the time series data, thereby improving the efficiency of computation.

Furthermore, training machine learning models for the time series data is challenging due to lack of labelled data. The information for a member may be labelled through manual inspection by determining whether the member is responsive to a particular communication channel. However, this is a tedious and error prone process. Alternatively, the labelling can be obtained by performing surveys of users. However, the rate at which users respond to such surveys is typically low, thereby providing only small amount of training data. Furthermore, data obtained via surveys may be biased and therefore inaccurate. Embodiments provide an automatic technique for labelling the training data by determining a score indicating how responsive a member is to a specific communication channel based on analysis of time-series data. This allows automatic determination of the labels for generating training data for training machine learning models. The ability to automate the process allows for generation of more training data that results in better trained machine learning models. Furthermore, the training data generated has high accuracy compared to manual labelling that is more error prone.

Additional Considerations

It is to be understood that the Figures and descriptions of the present invention have been simplified to illustrate elements that are relevant for a clear understanding of the present invention, while eliminating, for the purpose of clarity, many other elements found in a multi-tenant system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for communicating with users, comprising:

identifying a user for sending a communication via one of a plurality of communication channels;

accessing user profile of the user, the user profile including time series data based on past communications with the user;

generating a feature vector based on a user profile of the user, the feature vector including information based on the time series data of the user profile;

for each of a plurality of communication channels:

providing the generated feature vector as input to a machine learning based model for the communication channel, the machine learning based model configured to receive a feature vector describing an input user and predict a likelihood of the input user performing an expected user action responsive to a communication sent to the user via the communication channel; and executing the machine learning based model to determine a score indicating a likelihood of the user performing the expected user action responsive to receiving a communication via the communication channel;

wherein the user is a patient of a healthcare provider, the expected user action comprises the patient picking up a prescribed medication, and the communication channels include at least one of: an automated voice call, a live agent call, an in-pharmacy notification, or a text message;

selecting a communication channel associated with a score indicating the highest likelihood of the patient picking up the prescribed medication;

sending a communication to the user via the selected communication channel associated with the score indicating the highest likelihood of the patient picking up the prescribed medication by invoking a channel-specific application programming interface of a communication engine associated with the selected communication channel, the communication including information relating to the prescribed medication that the patient needs to obtain;

selecting a first user to test the machine learning based model;

obtaining a causality analysis of historical communications time series data of the first user and historical events time series data of the first user for each of the communication channels that measures the responsiveness of the first user to each of the communication channels;

comparing results of the executed machine learning based model for each of the communication channels with results of the causality analysis for each of the communication channels to determine whether there is a conflict in the results for the first user;

relabeling the first user's data in an associated training dataset or excluding the first user from the associated training dataset if there is a conflict in the results; and retraining the machine learning based model using the modified associated training dataset.

2. The computer-implemented method of claim 1, wherein the plurality of communication channels comprises:

a communication channel for sending text messages, a communication channel for leaving voice mail, a communication channel for calling via live agent.

3. The computer-implemented method of claim 1, wherein the machine learning based model is a classification based model.

\* \* \* \* \*